(12) United States Patent
Carnevali

(10) Patent No.: US 8,066,313 B2
(45) Date of Patent: Nov. 29, 2011

(54) QUICK RELEASE FASTENERS FOR A VEHICLE CONSOLE

(76) Inventor: Jeffrey D. Carnevali, Seattle, WA (US)

(*) Notice: Subject to any disclaimer, the term of this patent is extended or adjusted under 35 U.S.C. 154(b) by 0 days.

(21) Appl. No.: 12/387,779

(22) Filed: May 7, 2009

(65) Prior Publication Data

US 2011/0001328 A1    Jan. 6, 2011

Related U.S. Application Data

(63) Continuation-in-part of application No. 12/287,622, filed on Oct. 10, 2008, now Pat. No. 7,802,832.

(51) Int. Cl.
*B60R 13/00* (2006.01)

(52) U.S. Cl. .................................................. 296/24.34

(58) Field of Classification Search ............... 296/24.34, 296/214, 37.7, 37.8, 70; 180/90
See application file for complete search history.

(56) References Cited

U.S. PATENT DOCUMENTS

| | | | |
|---|---|---|---|
| 1,417,401 A | 5/1922 | Mahoney | |
| D218,438 S | 8/1970 | Shook et al. | |
| 3,550,001 A | 12/1970 | Hanley | |
| 3,984,161 A | 10/1976 | Johnson | |
| 4,313,646 A * | 2/1982 | Millhimes et al. ............ | 439/654 |
| D279,329 S | 6/1985 | Dzak | |
| 4,733,900 A | 3/1988 | Fluharty | |
| 4,846,382 A | 7/1989 | Foultner et al. | |
| 5,005,898 A | 4/1991 | Benedetto et al. | |
| 5,174,621 A | 12/1992 | Anderson | |
| 5,181,555 A | 1/1993 | Chruniak | |
| 5,199,772 A | 4/1993 | Jordan | |
| 5,259,655 A * | 11/1993 | Anderson ........................ | 296/70 |
| 5,282,556 A | 2/1994 | Bossert | |
| 5,418,836 A * | 5/1995 | Yazaki ........................ | 455/569.2 |
| D363,916 S | 11/1995 | Johnson | |
| 5,503,565 A * | 4/1996 | McCoy .......................... | 439/171 |
| 5,680,974 A * | 10/1997 | Vander Sluis ................. | 224/281 |
| 5,743,585 A * | 4/1998 | Pranger et al. ............ | 296/37.12 |
| 6,048,020 A | 4/2000 | Gronowicz et al. | |
| D425,475 S | 5/2000 | Herer | |
| 6,062,623 A * | 5/2000 | Lemmen ....................... | 296/37.8 |
| 6,086,129 A | 7/2000 | Gray | |
| D429,209 S | 8/2000 | Inchaurregui | |
| D429,684 S | 8/2000 | Johnson | |
| 6,123,377 A | 9/2000 | Lecher et al. | |
| D434,365 S | 11/2000 | Herer et al. | |
| 6,176,534 B1 * | 1/2001 | Duncan ....................... | 296/37.12 |
| D437,299 S | 2/2001 | Johnson | |
| D438,841 S | 3/2001 | Smith | |
| D443,246 S | 6/2001 | Smith | |
| D443,855 S | 6/2001 | Herer et al. | |
| D447,998 S | 9/2001 | Pfeiffer et al. | |
| D453,318 S | 2/2002 | Moore | |

(Continued)

*Primary Examiner* — Kiran B. Patel
(74) *Attorney, Agent, or Firm* — Charles J. Rupnick, Attorney at Law

(57) ABSTRACT

A vehicle console having a quick release fastener and being formed of a console frame comprising two side panels and two end panels; spaced apart mounting lip portions provided on the console frame; a face plate comprising connection portions thereof securable with a respective one of the mounting lip portions; and a quick release fastener comprising an actuator operable through the face plate adjacent to one of the connection portions, and a jaw portion that is responsive to actuation of the actuator for moving between an unclamped state extended over the respective connection portion and spaced away therefrom, and a clamped state adjacent to the respective connection portion with a portion of the mounting lip portion clamped therebetween.

7 Claims, 7 Drawing Sheets

U.S. PATENT DOCUMENTS

| | | | |
|---|---|---|---|
| 6,388,881 B2 * | 5/2002 | Yamauchi et al. | 361/704 |
| 6,428,072 B1 | 8/2002 | Moore | |
| 6,709,041 B1 | 3/2004 | Hotary et al. | |
| 7,165,687 B1 * | 1/2007 | Stevens et al. | 211/86.01 |
| 7,210,725 B2 | 5/2007 | Moore | |
| 7,407,210 B2 * | 8/2008 | Arbaugh et al. | 296/24.34 |
| 2005/0035618 A1 | 2/2005 | Toth et al. | |
| 2009/0072565 A1 * | 3/2009 | Mayne, Jr. | 296/24.34 |

* cited by examiner

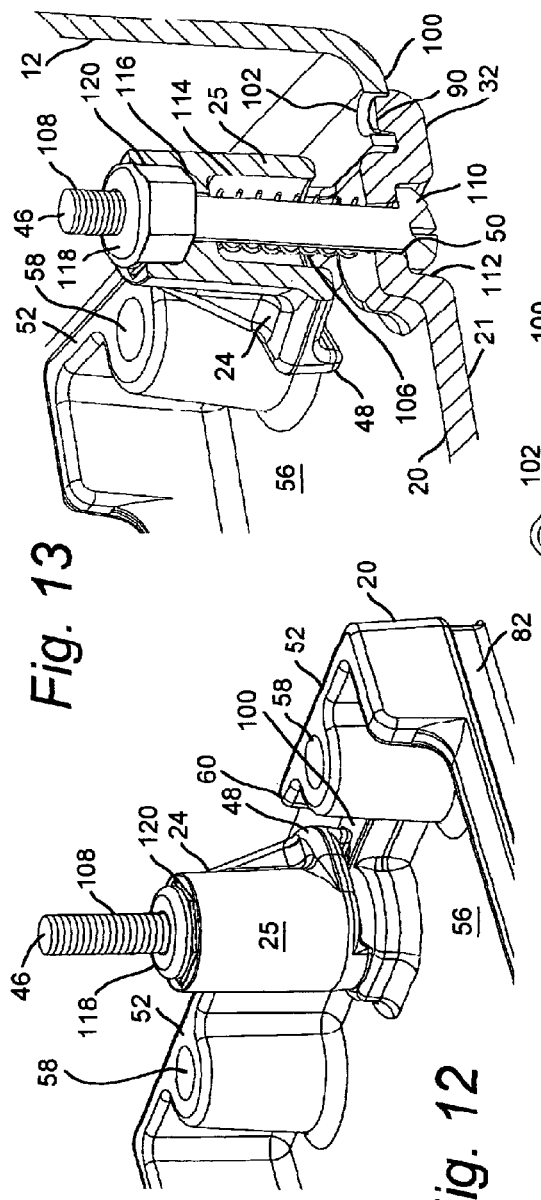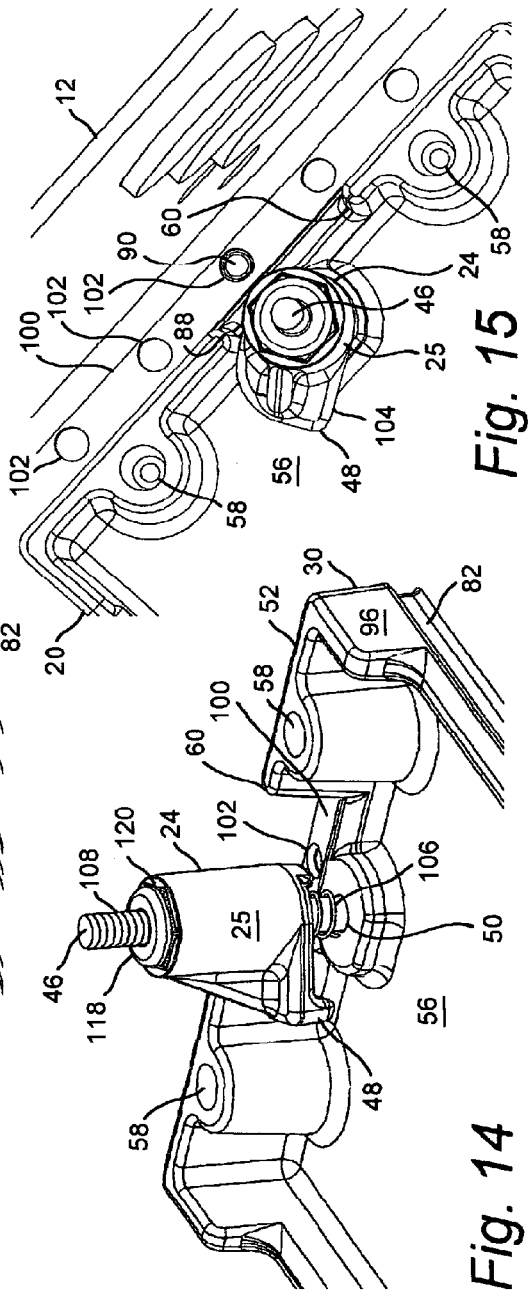

QUICK RELEASE FASTENERS FOR A VEHICLE CONSOLE

This application is a Continuation-in-part patent application Ser. No. 12/287,622 filed in the name of the same inventor on Oct. 10, 2008, now U.S. Pat. No. 7,802,832 which is incorporated herein by reference.

FIELD OF THE INVENTION

The present invention relates to vehicle consoles mountable within a vehicle driver compartment to support either mechanical, electrical or electro-mechanical equipment, and in particular to vehicle consoles that provide a plurality of removable face plates each secured to the console with a pair of quick release fasteners.

BACKGROUND OF THE INVENTION

Police officers, public safety officers, firefighters, paramedics and the like carry various types of equipment in their vehicles. Several pieces of equipment are often carried in a single vehicle, and the driver often needs to operate the equipment while simultaneously driving the vehicle. Thus, various devices exist to secure multiple pieces of equipment within a vehicle so that they are accessible to the driver and/or other persons in the vehicle driver compartment.

These devices commonly include a hollow rectangular box situated on the floor of the vehicle between the driver seat and front passenger seat, including a horizontal top portion having an upwardly facing opening for receiving pieces of equipment. Police cruisers, for example, are commonly fitted with equipment boxes of this type. The boxes are used to house various types of equipment and controls used by police officers, such as radios, siren controls and light bar controls. Typically, the boxes are sized and positioned so that most of the box extends between the driver seat and the front seat. Only a small portion, if any, of the box will extend forward toward the dashboard beyond the driver seat and front passenger seat. In some police cruisers, the equipment box extends all the way back to the prisoner partition separating the rear seating area from the driver compartment. A laptop computer is often positioned between the box and dashboard, and is secured to the vehicle floor with various types of mounting hardware.

Systems employing the conventional equipment box described above suffer from a number of problems associated with the structure of the box which includes multiple removable blank panels fastened on its top or upwardly facing surface. Removal of one or more of these blank panels opens a space where a radio or other piece of equipment can be mounted using brackets that fasten between the piece of equipment and opposing side panels of the box. Unfortunately, the equipment mounting brackets fasten to the box side panels using screws so the equipment is not easily repositioned within the bore or changed out for different pieces of equipment.

SUMMARY OF THE INVENTION

The present invention is a vehicle console having a plurality of removable face plates each secured to the console with a pair of quick release fasteners. The quick release fasteners each having an actuator that operable through the face plate adjacent to one of the connection portions, and a jaw portion that is responsive to actuation of the actuator for moving between an unclamped state extended over a connection portion of the face plate and spaced away therefrom, and a clamped state adjacent to the respective connection portion with a portion of a mounting lip portion of the console clamped therebetween.

According to one aspect of the vehicle console, the vehicle console includes a console frame comprising two side panels and two end panels, with spaced apart mounting lip portions provided on the console frame. The face plate has a pair of connection portions that are securable with a respective one of the mounting lip portions of the console. A quick release fastener for securing the face plate to the console includes an actuator that is operable through the face plate adjacent to one of the connection portions, and a jaw portion that is responsive to actuation of the actuator for moving between an unclamped state extended over the respective connection portion and spaced away therefrom, and a clamped state adjacent to the respective connection portion with a portion of the mounting lip portion of the console clamped therebetween.

According to another aspect of the vehicle console, the quick release fastener further includes a biasing member that is positioned to urge the jaw portion into the unclamped state, and wherein the actuator is further operable for forcing the jaw portion into the clamped state.

According to another aspect of the vehicle console, the quick release fastener is further responsive to actuation of the actuator for moving between a clamping position having the jaw portion extended over the connection portion thereof with the mounting lip portion of the console's frame being positioned therebetween, and a release position having the jaw portion spaced away from the connection portion, and wherein in the clamping position the jaw portion is further responsive to actuation of the actuator for moving between the unclamped state and the clamped state.

According to another aspect of the vehicle console, the actuator of the quick release fastener is further configured to rotate the jaw portion between the clamping position and the release position; and the face plate is further configured with a substantially rigid jam portion that is positioned to engage the jaw portion of the fastener in at least one of the clamping position and the release position.

According to another aspect of the vehicle console, the quick release fastener further includes a threaded interface between a body portion having the jaw portion thereof and the actuator.

According to another aspect of the vehicle console, the actuator of the quick release fastener further includes a threaded shaft, and the body portion thereof further includes an internally threaded aperture structured to cooperate with the threaded shaft of the actuator.

According to another aspect of the vehicle console, the vehicle console further includes a pair of quick release fasteners, with each quick release fastener positioned adjacent to a different one of the connection portions of the face plate.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 12 is a section view that illustrates the releasable fastener in the second clamped state of the clamping position illustrated in FIG. 9;

FIG. 13 is a section view that illustrates the releasable fastener in the release position shown in FIGS. 7 and 8;

FIG. 14 is a perspective view of the releasable fastener being rotated into the release position, as illustrated in FIG. 13; and FIG. 15 is an exemplary bottom view of one face plate being installed or removed from the console.

DETAILED DESCRIPTION OF PREFERRED EMBODIMENT

In the Figures, like numerals indicate like elements.

Figure 1:
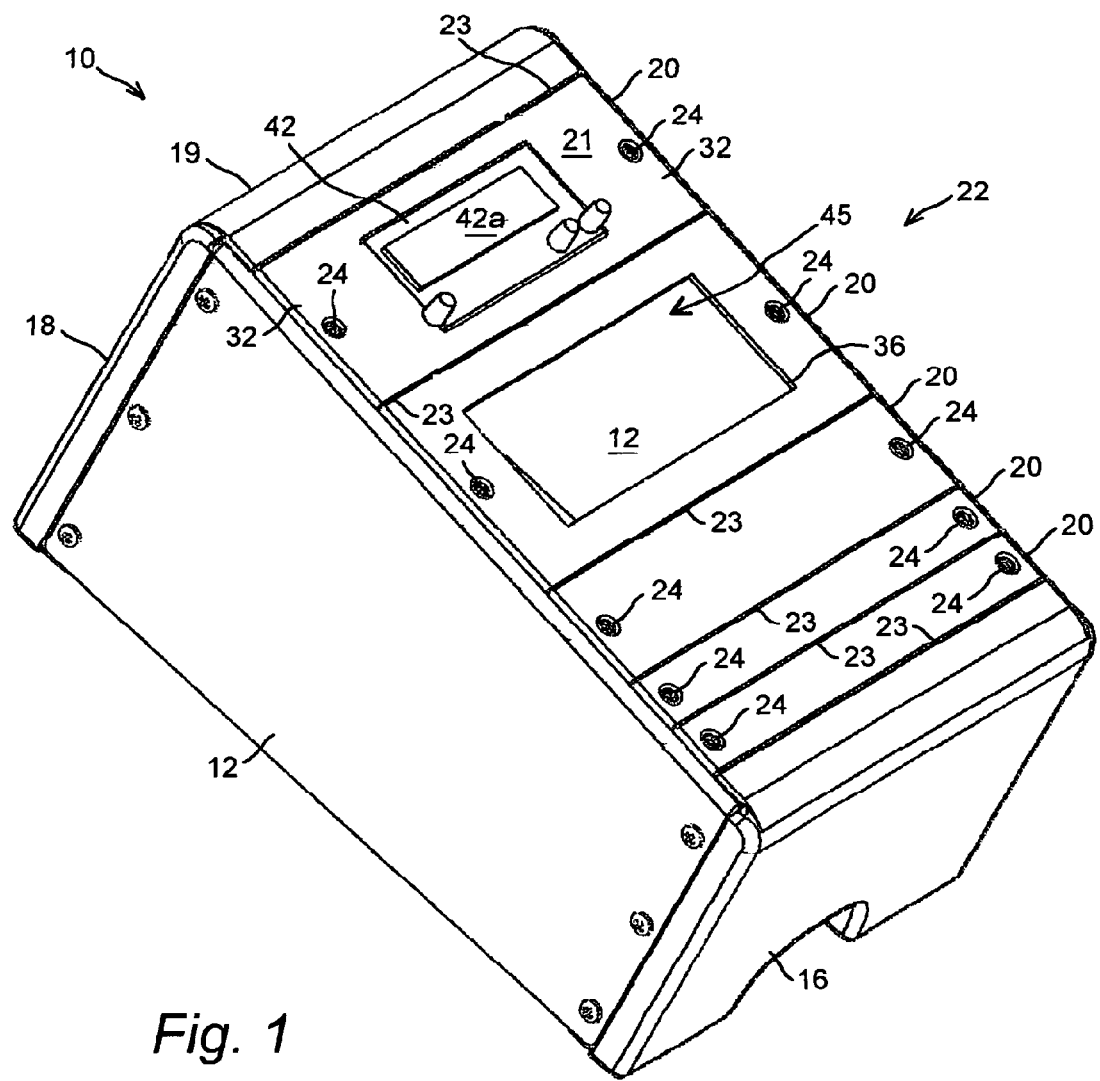
FIG. 1 is a perspective view showing an example of the novel reconfigurable vehicle console.

FIG. 1 is a perspective view that illustrates a novel reconfigurable vehicle console 10 having opposing first and second substantially rigid side panels 12 each configured for being secured to the drive shaft floor hump of the vehicle using, for example using an interface plate attached to the hump and having a plurality of fastener holes spaced along side flanges arranged along the hump. Side panels 12 are substantially rigidly interconnected with opposing first and second substantially rigid end panels 16 and 18. End panels 16, 18 are substantially the same width such that side panels 12 are spaced apart a substantially uniform or constant distance between end panels 16, 18, thereby forming a substantially rectangular support frame 19.

A plurality of substantially interchangeable face plates 20 are removably clamped to side panels 12 of rectangular support frame 19 between opposing end panels 16, 18. A plurality of face plates 20 are removably clamped between side panels 12 with respective substantially planar external or outer surfaces 21 partially forming a top or upwardly facing surface 22 of console 10 when installed.

Overlapping joints 23 are formed between adjacent face plates 20, and additional overlapping joints 23 are formed between end ones of the face plates 20 and respective adjacent end panels 16, 18. In contrast to the butt joints typical in prior art consoles, overlapping joints 23 are distinctly more sealed and secure than such butt joints.

A pair of releasable fasteners 24, such as screws or releasable clamps, secures opposing connection portions 32 of each of face plates 20 to side panels 12.

One or more different face plates 20 receive an equipment piece 42, such as a radio, global positioning sensor (GPS), or siren and light bar controls, or other control switches. When present, optional cutouts 36 are either sized to industry standards for a particular equipment piece 42, else cutout 36 is custom sized to match a particular make and model of equipment piece 42. Face plate 20 thus functions as a face plate for the equipment piece 42 being secured thereto, with cutout 36 functioning as a bezel surrounding an operating face 42a of equipment piece 42.

Figure 2:
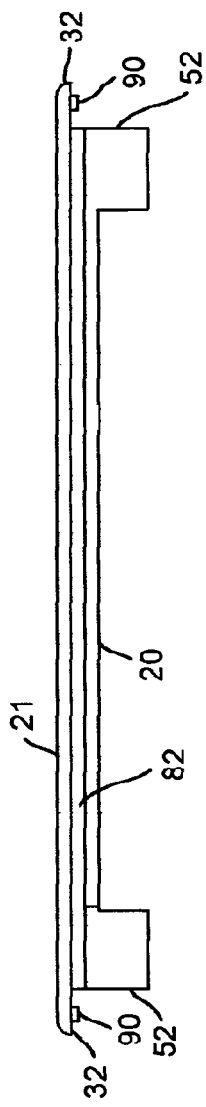
FIG. 2 is an exemplary side view of one equipment mounting face plate.
Figure 4:
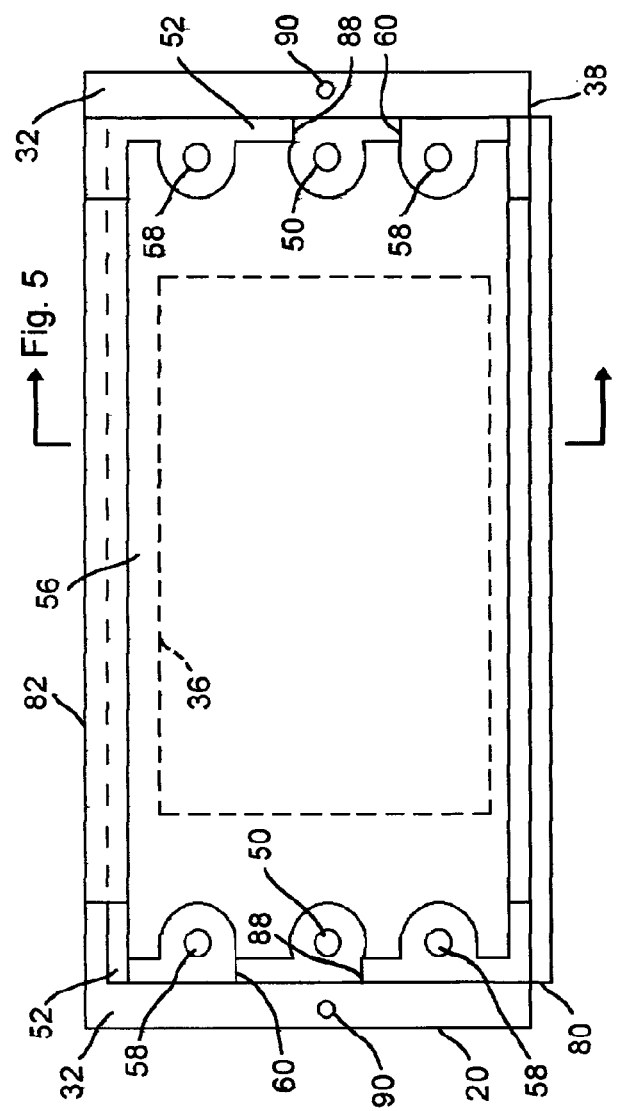
FIG. 4 is exemplary bottom view of one equipment mounting face plate.
Figure 3:
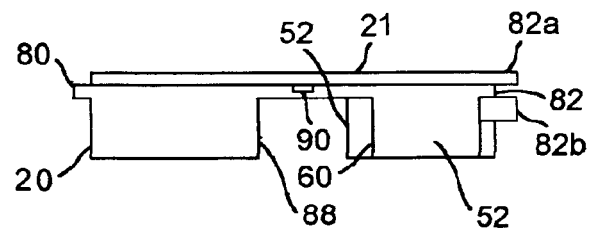
FIG. 3 is an exemplary end view of one equipment mounting face plate.

FIG. 2, FIG. 3 and FIG. 4 are exemplary side, end and bottom views, respectively, of one embodiment of face plate 20 having the overlapping joints 23 optionally structured as tongue-and-groove joints. By example and without limitation, face plate 20 is shown here having a tongue 80 extending most of the length of face plate 20 between opposing connection portions 32 embodied as respective edge nesting lips. A groove 82 is positioned opposite from the tongue 80 and is sized to receive and with mate the tongue 80. Tongue 80 and groove 82 of adjacent face plates 20 are joined to form tongue-and-groove type overlapping joints 23. In tongue-and-groove type joints 23, tongue 80 is overlapped both above and below by a pair of spaced apart upper support lip 82a and lower support lip 82b that form groove 82. Upper support lip 82a is positioned adjacent to or flush with outer surface 21 of face plate 20. Tongue 80 and groove 82 of end face plates 20 are joined with end panels 16, 18 to form additional tongue-and-groove type joints 23 there between.

Locators are provided between side panels 12 and each face plate 20, as disclosed more fully herein. Accordingly, each edge nesting lip 32 of face plate 20 is further formed with a detent 90 positioned thereon for locating face plate 20 on side panels 12 of console 10, as disclosed herein. By example and without limitation, detents 90 are positioned in about the middle of nesting lips 32.

Each face plate 20 is further illustrated to have a pair of substantially upright projections 52 positioned on an interior surface 56 thereof. Upright projections 52 are positioned adjacent to and slightly inwardly of respective edge nesting lips 32 of face plate 20 and extended substantially completely across its inner surface 56. Projections 52 include a pair of junctions 58 positioned adjacent to respective edge nesting lips 32. By example and without limitation, junctions 58 are configured as fastener receivers for receiving a threaded fastener 62 thereinto. When configured as fastener receivers, junctions 58 are, for example, either blind, smooth bore holes structured for receiving self-tapping screws, or pre-threaded blind holes. Projections 52 function as mounting structure for equipment piece 42, as discussed herein below.

A pair of fastener clearance passages 50 are formed through face plate 20. Fastener clearance passages 50 are positioned at about the middle of face plate 20 adjacent to edge nesting lips 32. Fastener clearance passages 50 are thus substantially aligned with detents 90. When the pair of fasteners 24 securing face plates 20 to side panels 12 of console 10 are configured as releasable clamps, a clearance notch 60 is formed through upright projections 52 in a position between respective fastener clearance passages 50 and edge nesting lips 32 for operating releasable clamp type fasteners 24 through clearance notches 60. A substantially upright jam 88 forms one side of clamp clearance notch 60 and operates as a stop for clamp type fasteners 24.

When configure to receive a bezel-type equipment piece 42, face plate 20 is additionally formed with optional cutout 36 that is sized to receive there through an equipment piece 42, such as a radio, global positioning sensor (GPS), or siren and light bar controls, with the equipment piece 42 being secured to the face plate 20. Face plate 20 thus functions an aesthetic frame and functional support for equipment piece 42 being secured thereto, with cutout 36 functioning as a bezel surrounding an operating face 42a of equipment piece 42.

Figure 5:
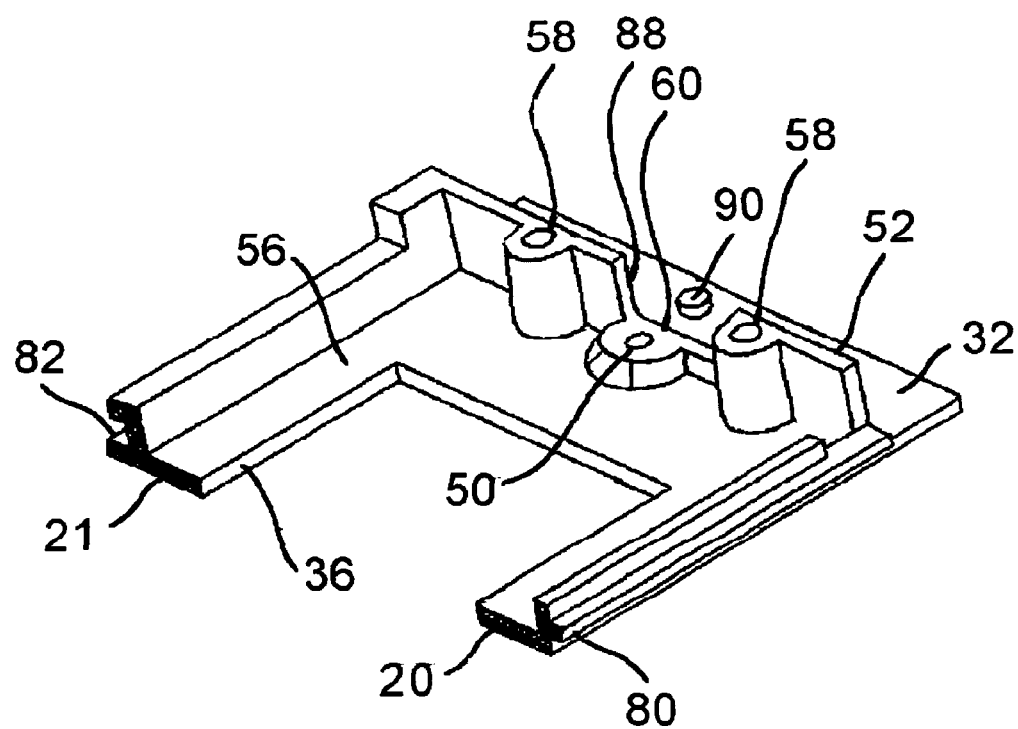
FIG. 5 is a section view taken through one equipment mounting face plate.

FIG. 5 is a section view taken through face plate 20 showing an illustrative partial bottom perspective view with optional cutout 36 shown extending through equipment mounting face plate 20 between exterior and interior surfaces 21, 56 thereof.

Figure 6:
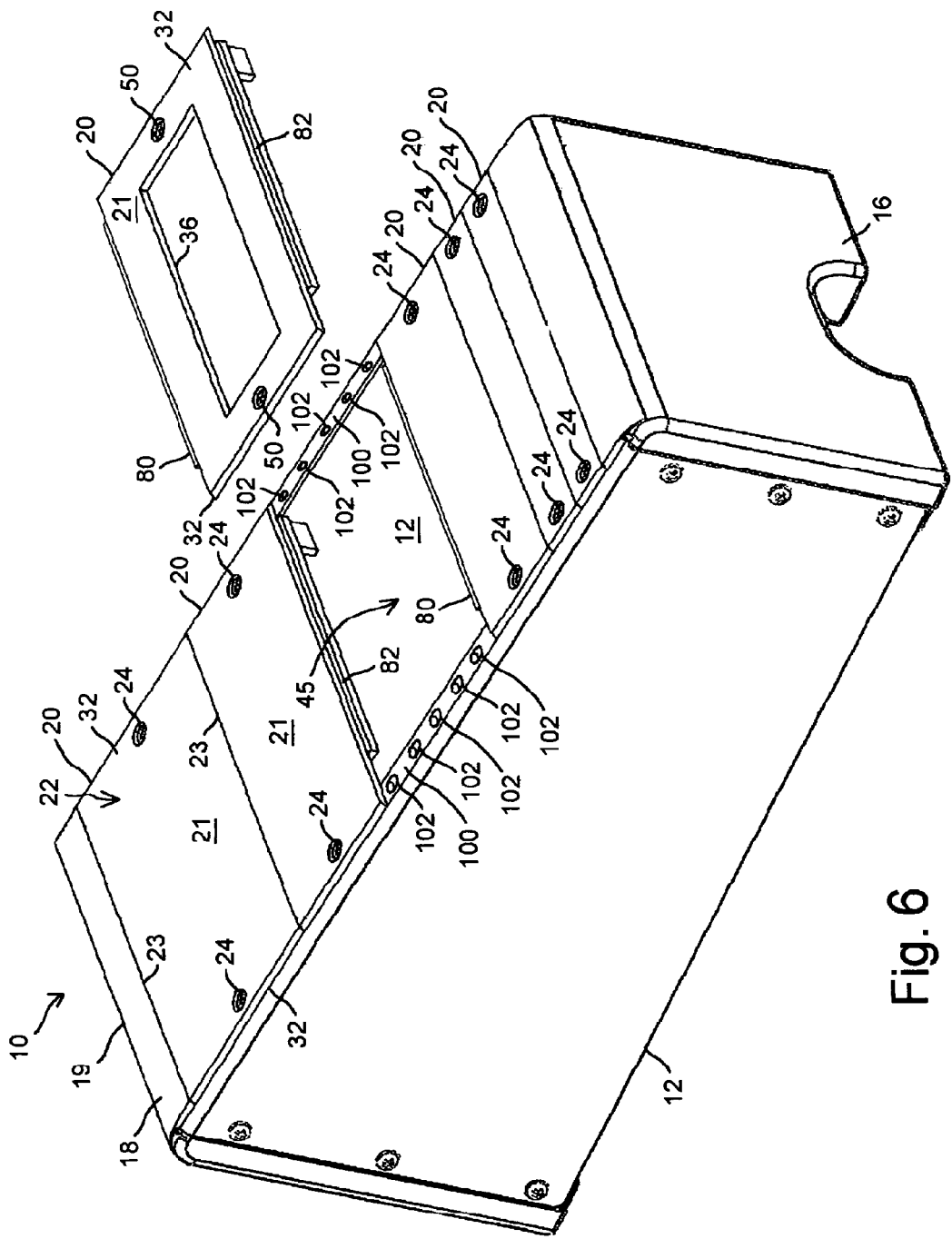
FIG. 6 illustrates installation/removal of one of the face plates with the console.

FIG. 6 illustrates installation/removal of one face plates 20 with console 10. As illustrated here, overlapping joints 23 are formed between adjacent face plates 20 and between end face plates 20 and adjacent console end panels 16, 18. Console 10 is optionally fitted with any combination of face plates 20 of any width to suit an end purpose having one or more equipment piece 42 arranged on the console 10 in any order desired.

As illustrated here, each side panel 12 is further formed with an upper mounting lip 100 bent at right angles and facing one another inwardly across console 10. Mounting lips 100 support opposing edge nesting lips 32 of each face plate 20, while providing clamping surfaces for releasable clamp fasteners 24. Clearance for projections 52 on interior surface 56 of face plate 20 is provided between upper mounting lips 100 of space apart side panels 12. Locators are optionally provided between mounting lips 100 and edge nesting lips 32 of each face plate 20. For example, mounting lips 100 are formed with a plurality of detent receivers 102 spaced at substantially uniform intervals there along for receiving detents 90 formed on the face plates 20. Only by example and without limitation, detent receivers 102 are formed as holes spaced slightly away from the inwardly facing edge of mounting lip 100. Hole type receivers 102 are sized to receive detents 90 of any face plate 20. When face plates 20 are assembled in vehicle console 10 with fasteners 24, detents 90 of different face plates 20 anchor side panels 12 by means of being substantially interlocked with hole type receivers 102, whereby face plates 20 act as stabilizers between side panels 12 to stiffen console 10. Therefore, side panels 12 can be made thinner and lighter without compromising to overall stiffness and integrity of console 10.

Alternatively, detent receivers 102 are optionally formed as slots or notches that open into inwardly facing edge of mounting lip 100. Openings or notches 102 are sized to receive detents 90 of any face plate 20.

After face plate 20 is mated with console side panels 12, fasteners 24 are operated to releasably retain each face plate 20 relative to upper mounting lips 100. Subsequently, different face plates 20 can be removed and interchanged at will to arrange and rearrange console 10 as desired. More bezel type equipment pieces 42 can be accommodated by utilizing more face plates 20 having cutouts 36, or some can be replaced with blank face plates 20 to accommodate surface mount equipment 42. Accordingly, in contrast to prior art consoles, console 10 is truly reconfigurable.

Figure 8:
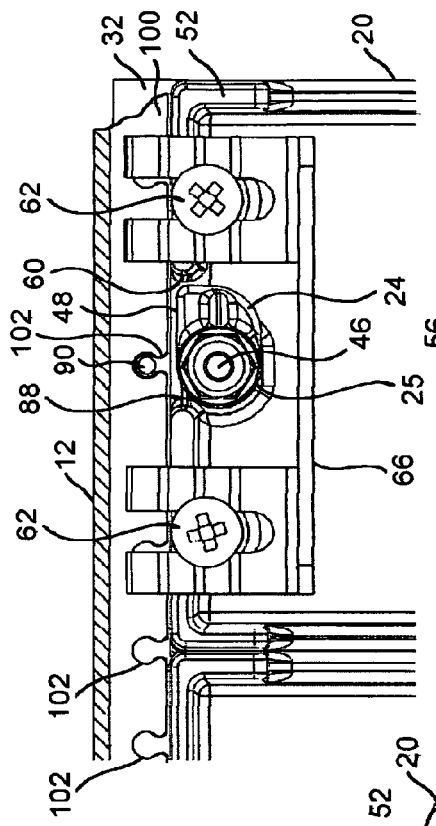
FIG. 8 illustrates installation/removal of one of the face plates with the console.
Figure 7:
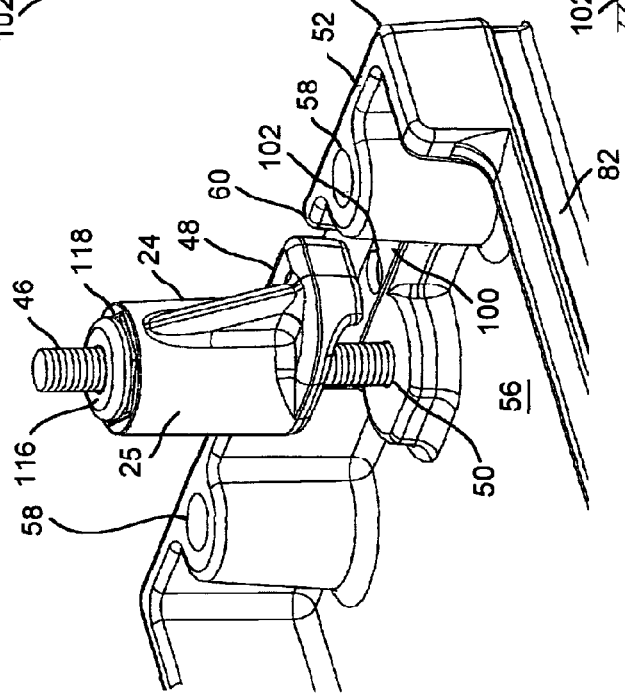
FIG. 7 illustrates installation/removal of one of the face plates with the console.

FIG. 7 and FIG. 8 are exemplary perspective and bottom views, respectively, of one face plate 20 being installed or removed from console 10. Releasable clamp 24 is shown in a release position having its movable jaw portion 48 spaced inwardly of respective opposing edge nesting lips 32 for passing between opposing inwardly facing upper mounting lips 100 of console side panels 12 for removal of face plate 20 from console 10. Releasable clamps 24 are similarly positioned for passing between opposing inwardly facing upper mounting lip 100 of console side panels 12 during installation of face plate 20 into console 10. Thus, the position shown for releasable clamps 24 operates as both a release position and an installation position.

In FIG. 8, the right angled upper mounting lip 100 of side panel 12 is broken away to reveal edge nesting lips 32 of face plate 20 resting on its upper surface. L-bracket 66 is illustrated for mounting bezel-type equipment 42 to fastener receiver-type junctions 58 of projections 52 by means of threaded fasteners 62.

Figure 9:
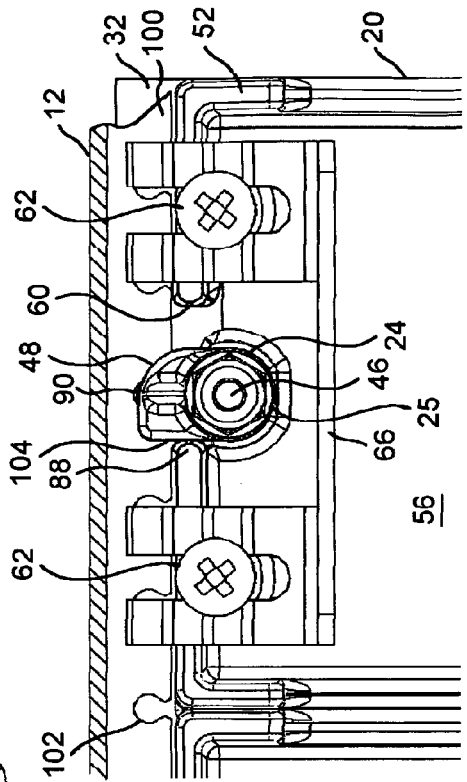
FIG. 9 illustrates that a jaw portion of a releasable fastener is sized to pass through a clearance notch in a substantially upright projection formed on the face plate for moving between its release or installation position and a clamping position.

FIG. 9 illustrates that jaw portion 48 of each clamp 24 is sized to pass through clearance notch 60 in a respective one of substantially upright projections 52 for moving between its release or installation position and a clamping position. Here, clamp 24 is transitioned from the release position shown in FIGS. 12 and 13 wherein jaw 48 is spaced inwardly of respective opposing edge nesting lips 32, to a clamping position having jaw portion 48 oriented substantially transverse of a respective one of the opposing edge nesting lips 32 and extended thereover with upper mounting lip portion 100 of a respective one of opposing side panels 12 being positioned therebetween.

For example, each releasable clamp 24 includes a substantially rigid body portion 25 which is formed with jaw portion 48. An actuator 46 of clamp 24 is operable through one of receivers 50 for engaging or disengaging movable jaw portion 48. By example and without limitation, body portion 25 of clamp 24 is movable by actuator portion 46 for rotationally transitioning the jaw portion 48 between the release and clamping positions.

In the clamping position of releasable clamp 24, jaw portion 48 of the movable clamp body 25 is positioned in clamp actuator clearance passage 50 through projections 52. A stop portion 104 of jaw 48 is substantially engaged with the substantially upright jam 88 forming one side of clamp clearance notch 60. Jaw portion 48 of clamp body 25 is thus oriented substantially transverse of respective edge nesting lips 32 and extended generally over detent 90.

Figure 10:
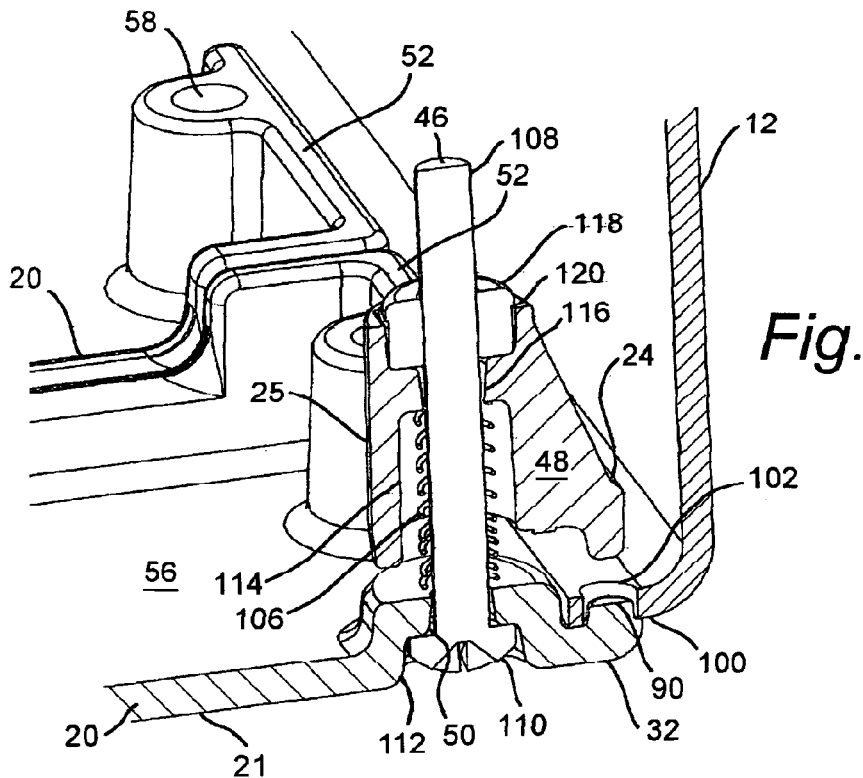
FIG. 10 is a section view that illustrates the releasable fastener in a first unclamped state of the clamping position illustrated in FIG. 9 having the jaw portion of the fastener body engaged with a substantially rigid jam at one side of the actuator clearance passage.

FIG. 10 is a section view that illustrates releasable clamp 24 in the clamping position illustrated in FIG. 9 having jaw portion 48 of clamp body 25 engaged with substantially upright jam 88 at one side of clamp clearance notch 60. Here, releasable clamp 24 is illustrated in a first unclamped state having jaw portion 48 of movable clamp body 25 oriented substantially transverse of respective edge nesting lips 32 and spaced away therefrom in a position extended thereover. Edge nesting lips 32 of face plate 20 rest on the right angled, inwardly facing upper mounting lips 100 of side panels 12 of console 10. Detents 90 of edge nesting lips 32 are nested in openings or notches 102 in upper mounting lips 100 of side panels 12.

Releasable clamp 24 is shown here in cross-section. Clamp actuator 46 is operable through a respective one of the clamp actuator clearance passages 50 formed through each face plate 20 adjacent to edge nesting lips 32. Each releasable clamp 24 has a compression spring or other biasing member 106 positioned to urge movable clamp body 25 and jaw portion 48 away from respective edge nesting lips 32. Actuator portion 46 is further configured to force movable clamp body 25 into the first unclamped state having jaw portion 48 spaced above respective edge nesting lips 32 in a position extended thereover.

Actuator portions 46 of releasable clamps 24 have an elongated threaded shaft portion 108 sized to pass through clamp actuator clearance passage 50 in face plate 20, and a slotted drive head portion 110 positioned externally of outer surface 21 of face plate 20. By example and without limitation, drive head portion 110 is seated within an appropriate recess 112 such as a countersink or counterbore (shown).

Movable clamp body 25 of each releasable clamp 24 is formed with an elongated internal bore 114 having actuator shaft 108 passing therethrough. Biasing member 106 is compressible within elongated internal bore 114. Elongated threaded shaft portion 108 of actuator portion 46 is extended through a clearance passage 116 formed through movable clamp body 25 and substantially aligned with internal bore 114.

An internally threaded portion 118 of clamp body 25 is substantially aligned with bore 114 at its base opposite from jaw portion 48. Threaded portion 118 is threadedly mated with threaded shaft portion 108 of actuator 46. For example, threaded portion 118 is an internally threaded aperture through a portion of clamp body 25. Alternatively, threaded portion 118 is a separate threaded nut having an internally threaded aperture. When internally threaded portion 118 of clamp body 25 is a separate nut, as shown, nut 118 is optionally seated in a socket 120 formed opposite from internal bore 114. Socket 120 substantially restrains separate threaded nut 118 from turning relative to clamp body 25 when actuator 46 is operated.

Figure 11:
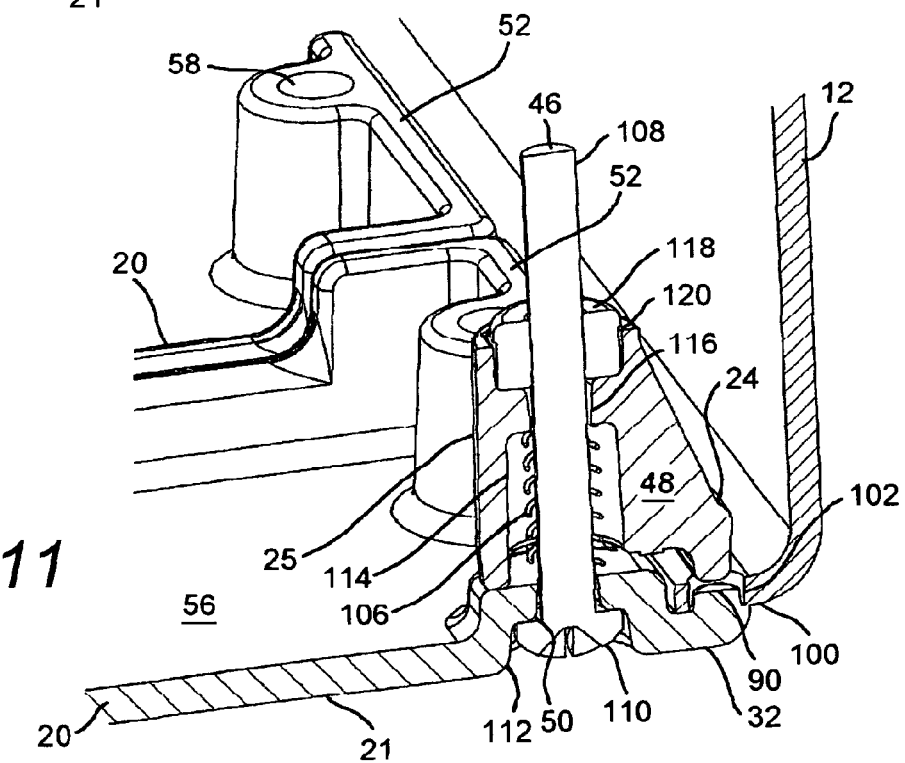
FIG. 11 is a section view that illustrates the releasable fastener in the first unclamped state of the clamping position illustrated in FIG. 9.

FIG. 11 is a section view that illustrates releasable clamp 24 in the clamping position illustrated in FIG. 9. Here, releasable clamp 24 is shown having its movable clamp body 25 transitioned from the first unclamped state shown in FIG. 10 wherein jaw portion 48 is spaced above edge nesting lips 32 in a position extended thereover, to a second clamped state wherein jaw portion 48 is oriented substantially transverse of edge nesting lips 32 and compressed adjacent thereto with a portion of upper mounting lips 100 of side panel 12 clamped between clamp jaw portion 48 and edge nesting lips 32. During such transition, actuator 46 of clamp 24 is actuated, for example by rotating in clamp actuator clearance passage 50 relative to threaded portion 118 of clamp body 25. Such actuation of actuator 46 forces clamp body 25 toward interior surface 56 of face plate 20, while drawing clamp jaw portion 48 toward edge nesting lips 32. Accordingly, compression spring or other biasing member 106 of releasable clamp 24 is compressed within internal bore 114 of clamp body 25. Biasing member 106 is thus compressed and ready to force releasable clamp 24 back into the first unclamped state, shown in FIG. 10, by forcing movable clamp body 25 away from interior surface 56 of face plate 20 for moving jaw portion 48 away from edge nesting lips 32 and releasing its hold on upper mounting lips 100 of side panels 12.

FIG. 12 is a section view of the second clamped state of releasable clamp 24, illustrated in FIG. 11, wherein jaw portion 48 is oriented substantially transverse of edge nesting lips 32 and compressed adjacent thereto with a portion of upper mounting lip 100 of side panel 12 clamped between clamp jaw portion 48 and respective edge nesting lips 32 of face plate 20.

FIG. 13 is a section view that illustrates releasable clamp 24 in the release position shown in FIGS. 12 and 13 wherein clamp body 25 is spaced away from interior surface 56 of face plate 20 by expansion of biasing member 106, and clamp jaw portion 48 is rotated by operation of actuator 46 inwardly through clearance notch 60 into a position spaced inwardly of edge nesting lips 32. For example, as operation of actuator 46 relieves the compressive force on clamp body 25, biasing member 106 urges jaw portion 48 away from compressive contact with upper mounting lip 100 of console side panel 12. After compressive contact with upper mounting lip 100 is relieved, clamp body 25 is permitted to rotate in the direction of rotation of actuator portion 46, carrying with it jaw portion 48 thereof. Clamp body 25 rotates at least until jaw portion 48 is rotated into the release position.

FIG. 14 is a perspective view of releasable clamp 24 being rotated into the release position, as illustrated in FIG. 13, wherein jaw 48 is spaced inwardly of edge nesting lips 32.

FIG. 15 is an exemplary bottom view of one face plate 20 being installed or removed from console 10. Releasable clamp 24 is illustrated as being rotated into the release position, as illustrated in FIGS. 18 and 19, wherein jaw 48 is spaced inwardly of edge nesting lips 32. Here, clamp body 25 is illustrated being rotated until jaw portion 48 engages jam portion 88 of clearance notch 60. Thereafter, clamp body 25 cannot be rotated further due to interference of jam 88. Accordingly, jaw portion 48 is restricted from reentering clearance notch 60 and so is positioned to clear upper mounting lip 100 of console side panel 12 for removal of face plate 20 from console 10, or installation thereinto.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A vehicle console having a quick release fastener, comprising:
    a console frame comprising two side panels and two end panels;
    spaced apart mounting lip portions provided on the console frame;
    a face plate comprising connection portions thereof securable with a respective one of the mounting lip portions; and
    a quick release fastener comprising an actuator operable through the face plate adjacent to one of the connection portions, and a jaw portion that is responsive to actuation of the actuator for moving between an unclamped state extended over the respective connection portion and spaced away therefrom, and a clamped state adjacent to the respective connection portion with a portion of the mounting lip portion clamped therebetween.

2. The console of claim 1 wherein the quick release fastener further comprises a biasing member positioned to urge the jaw portion into the unclamped state, and wherein the actuator is further operable for forcing the jaw portion into the clamped state.

3. The console of claim 2 wherein the quick release fastener is further responsive to actuation of the actuator for moving between a clamping position having the jaw portion extended over the connection portion with the mounting lip portion of the console frame being positioned therebetween, and a release position having the jaw portion spaced away from the connection portion, and wherein in the clamping position the jaw portion is further responsive to actuation of the actuator for moving between the unclamped state and the clamped state.

4. The console of claim 3 wherein the actuator of the quick release fastener is further configured to rotate the jaw portion between the clamping position and the release position; and
    wherein the face plate further comprises a substantially rigid jam portion positioned to engage the jaw portion of the fastener in at least one of the clamping position and the release position.

5. The console of claim 4 wherein the quick release fastener further comprises a threaded interface between a body portion comprising the jaw portion thereof and the actuator.

6. The console of claim 5 wherein the actuator of the quick release fastener further comprises a threaded shaft, and the body portion thereof further comprises an internally threaded aperture.

7. The console of claim 3, further comprising a pair of quick release fasteners, each quick release fastener positioned adjacent to a different one of the connection portions of the face plate.

* * * * *